United States Patent
Farrell et al.

(10) Patent No.: US 6,662,296 B1
(45) Date of Patent: Dec. 9, 2003

(54) METHOD AND SYSTEM FOR TESTING MILLICODE BRANCH POINTS

(75) Inventors: Mark S. Farrell, Plesant Valley, NY (US); John S. Liptay, Rhinebeck, NY (US); Charles F. Webb, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 628 days.

(21) Appl. No.: 09/677,231

(22) Filed: Oct. 2, 2000

(51) Int. Cl.[7] .................................................. G06F 9/26
(52) U.S. Cl. ............................................................ 712/236
(58) Field of Search ........................................... 712/236

(56) References Cited

U.S. PATENT DOCUMENTS

| | | | | |
|---|---|---|---|---|
| 4,407,015 A | * | 9/1983 | Ziobro ........................ | 712/236 |
| 4,636,943 A | * | 1/1987 | Horst et al. .................. | 712/236 |
| 5,045,993 A | * | 9/1991 | Murakami et al. ........... | 712/236 |
| 5,045,995 A | * | 9/1991 | Levinthal et al. ............ | 712/236 |
| 5,684,587 A | | 11/1997 | Naqwi | |
| 5,694,587 A | | 12/1997 | Webb et al. | |
| 5,794,026 A | * | 8/1998 | Hervin et al. ................ | 712/236 |
| 6,112,299 A | * | 8/2000 | Ebcioglu et al. ............ | 712/236 |

* cited by examiner

*Primary Examiner*—William M. Treat
(74) *Attorney, Agent, or Firm*—Lynn Augspurger; Cantor Colburn LLP

(57) ABSTRACT

An exemplary embodiment of the present invention is a method and system for reducing the number of branch instructions required to test combinations of millicode branch points. The method is implemented via a pipe-lined computer processor executing a millicode routine. The processor interrogates a millicode condition code; interrogates a first field of the TMBP instruction, the results of which determine a logical function to be performed on the millicode condition code; interrogates a second field of the TMBP instruction which specifies a first millicode branch point; interrogates a third field of the TMBP instruction, which specifies a second millicode branch point; and sets a millicode condition code based upon the results of the interrogating and used for executing subsequent TMBP instructions or conditional branch instructions.

33 Claims, 2 Drawing Sheets

METHOD AND SYSTEM FOR TESTING MILLICODE BRANCH POINTS

BACKGROUND OF THE INVENTION

This invention relates generally to improvements in pipe-lined computer processors that execute relatively simple instructions in hardware controlled execution units and execute relatively complex instructions in a milli-mode architected state with vertical microcode (i.e. millicode) routines executing in the same hardware controlled execution units. More particularly, this invention relates to a specialized millicode instruction which reduces the number of branch instructions required to test combinations of millicode branch points.

A new generation of S/390 ESA CMOS machines were introduced in 1997 by International Business Machines Corporation known as the G4 generation. Included was a pipelined computer processor which provides for the use of millicode. A milli-mode operation enables implementation of complex functions in a large, hardware controlled, pipelined, general purpose digital computer without a microprocessor. Milli-mode implements these complex functions with the flexibility provided by firmware and avoids a packaging problem introduced by the inclusion of microprocessor hardware. Rather than a microprocessor, milli-mode uses the pre-existing dataflow and hardware controlled execution units of a pipe-lined processor to accomplish complex functions. Additional hardware controlled instructions (private milli-mode only instructions) are added to provide control functions or to improve performance. These private milli-mode instructions augment the architected instruction set. Milli-mode routines can intermingle the milli-mode only instructions with architected instructions to implement complex functions as illustrated by U.S. Pat. No. 5,694,587, issued Dec. 2, 1997. U.S. Pat. No. 5,694,587 describes specialized millicoded instructions for a PSW Validity Test, Load With Access Test, and Character Translation Assist, which were employed in the IBM machine known as the G4 S/390 machine introduced in 1997. Related to U.S. Pat. No. 5,694,587 were additional applications related to millicode which are implemented in the same G4 S/390 machine introduced in 1997 by International Business Machines Corporation.

However, there are still improvements which may be made in the millicode environment. For example, while executing a millicode routine, it is important to have that routine executed as quickly as possible to improve the overall performance of the system. One of the operations that is done most frequently within a millicode routine is branching. Whenever branches are encountered within a millicode routine, the Instruction Processing Unit of the processor sometimes fetches and decodes instructions located on the incorrect path of the branch. For millicode execution there are many hardware conditions that the millicode can interrogate, which assist in controlling the actual execution of a specific millicode routine. Each of these conditions can be interrogated with a millicode instruction, (e.g. Branch Relative Special (BRS)) but, as before, the hardware may initially predict the wrong path of the branch and start fetching and decoding instructions that will not be executed. In addition, due to the format of the instruction, the branch target can only be 64K bytes away from the BRS, which may not give as much branch capability as the millicode routine would desire. It would be advantageous, therefore, to provide a solution that would reduce the number of branch instructions required to test combinations of millicode branch points, thereby resulting in fewer branches being decoded by the Instruction Processing Unit, and ultimately, fewer fetches down wrong branch paths.

SUMMARY OF THE INVENTION

An exemplary embodiment of the present invention is a method and system for reducing the number of branch instructions required to test combinations of millicode branch points. The method is implemented via a pipe-lined computer processor executing a millicode routine. The processor activates a millicode condition code; interrogates a first field of the Test Millicode Branch Points (TMBP) instruction, the results of which determine a logical function to be performed on the millicode condition code; interrogates a second field of the TMBP instruction which specifies a first millicode branch point; interrogates a third field of the TMBP instruction, which specifies a second millicode branch point; and modifies the milli-code condition code based on the results of the interrogating. A conditional branch instruction can then be executed based on the resultant milli-code condition code of the TMBP instruction.

DESCRIPTION OF THE PREFERRED EMBODIMENT

The following exemplary embodiment of the invention is applicable in the overall context of a system generally conforming to IBM 390 system architecture. While the System 390 environment will be used as an example, it should be understood that the present invention is also readily applicable to other IBM and non-IBM architectures as well.

Figure 1:
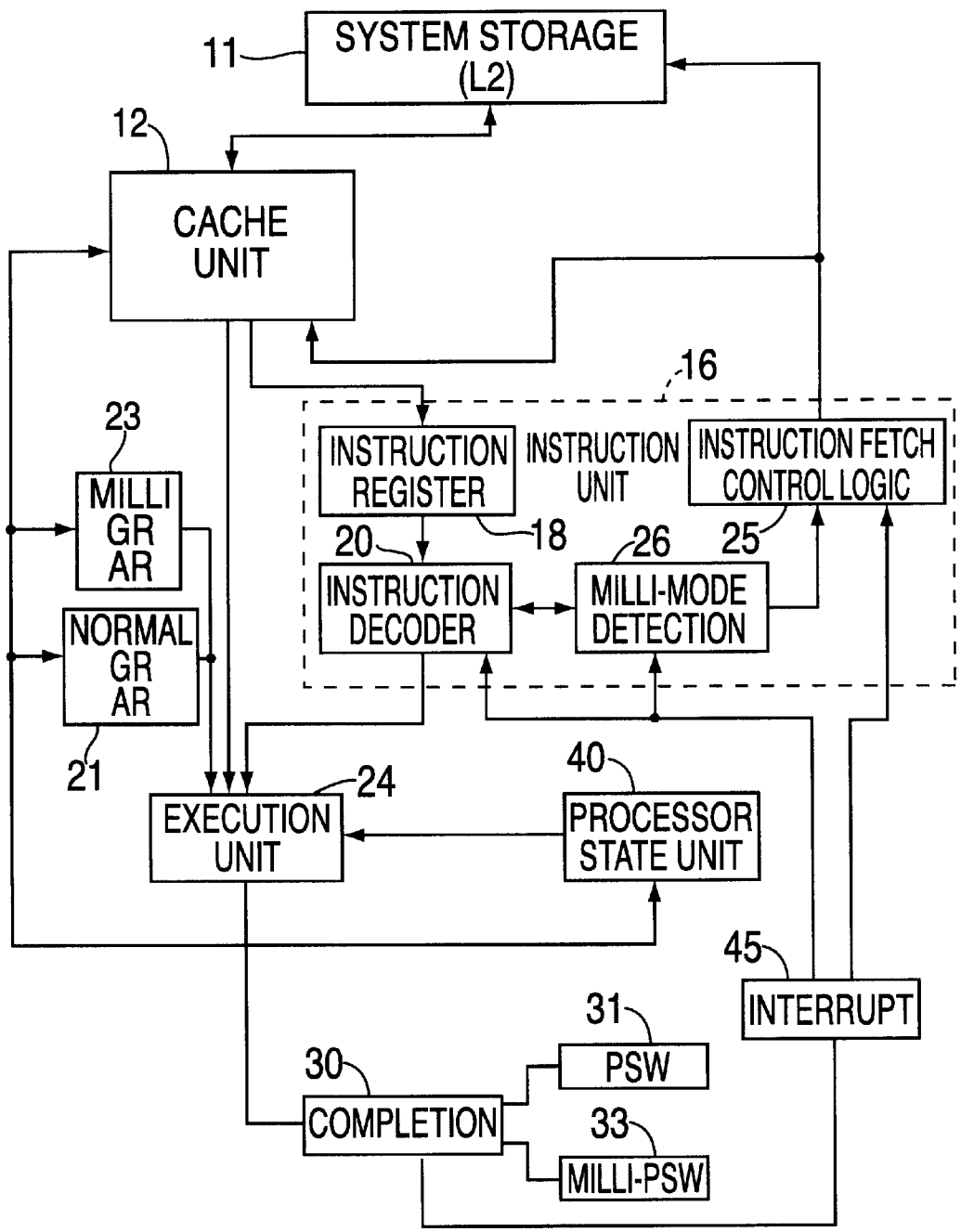
FIG. 1 is a block diagram illustrating the components of a millicode system in accordance with a preferred embodiment of the present invention.

Referring now to FIG. 1, elements of a system relevant to this invention include a system storage 11, and a cache memory unit 12. The system storage 11 contains the instructions that the processor is executing as well as the data those instructions are manipulating. The cache memory unit 12, which includes a copy of the data and instructions the processor is presently executing, in this preferred embodiment is a cache providing interleaved double word addressing.

An instruction unit subsystem 16 includes an instruction buffer (not shown in FIG. 1), instruction registers 18 and an instruction decoder 20. The instruction unit subsystem receives macro instructions, millicode instructions, and data from the cache memory unit 12. Instructions are parsed and placed into the instruction registers 18. The decoder 20 reads the contents of the instruction registers 18, decodes the instruction (or causes an operation exception), and passes the instruction to an instruction queue for sequential execution by a hardware execution unit 24. Each hardware execution unit 24 has access to a set of general purpose registers and access registers 23 for millicode instruction execution. Control logic controls the exchange of data between the two sets of registers when beginning or terminating a millicode routine.

Milli-mode detection logic 26 is coupled to the instruction registers and detects when a macro-instruction, which is being decoded, is of a type that is to be interpreted in a milli-mode operation. When this occurs, the milli-mode detection logic 26 generates an entry point address and passes this address along to the instruction fetch control logic 25 and places the decoder 20 in to a milli-mode operating state. In this state the decoder is enabled to decode macro-instructions which are not interpreted in millicode, as well as milli-mode instructions, all of which can be executed in execution unit 24. The special milli-mode instructions provide control functions needed by the milli-code routines. The set of millicode routines reside outside of the program addressable storage.

The system effects of an executed instruction are architecturally visible in the completion logic 30. Signal lines between the completion logic 30 and the decoder 20 allow the decoder 20 to keep track of instruction completion. A program status word (PSW) in register 31 controls execution of the macro-program. Similarly, the system also includes a milli-PSW register 33, which controls execution of the milli-routine. Both the execution unit 24 and completion logic 30 are connected to read from/write to the PSW and the milli-PSW registers. Thus, at any given point the execution units or the completion logic can read or update the appropriate one of the PSW and/or milli-PSW registers. A processor state unit 40 maintains the entire updated status of the architected system both in regular mode and milli-mode operation. In the event of a detected error, the processor state unit 40 provides a resource to recreate the status of the system for a check point state in order to allow a retry of the error causing operation.

Milli-mode is enabled when the milli-mode detection logic 26 recognizes that the macro-instruction being decoded is to be implemented with millicode. In response to this recognition, the detection logic 26 signals the decoder 20, the instruction fetch controls 25 and register controls in the execution unit 24. In response to the milli-mode recognition signal from the detection logic 26, the decoder 20 suspends macro-mode decoding and causes the system to subsequently use the milli-registers 23, instead of normal macro-mode registers 21. The milli-mode detection logic 26 generates a millicode entry point address.

The entry point address (generated by the milli-mode detection logic 26) is used by the control logic 25 to address the cache 12. Milli-instructions from the cache are sent to the instruction registers 18 where the decoder 20 decodes them and schedules them for execution.

When the processor enters milli-mode, it executes and completes the macro-instructions already in the pipeline conceptually prior to the instruction that caused entry into milli-mode. As the processor completes the macro-instructions, it updates the appropriate GPRs. At the same time, the processor decodes and executes the milli-instructions that implement the macro instruction that caused entry into milli-mode.

At some point the macro-instruction immediately prior to the instruction that caused entry to milli-mode will be indicated completed in the completion logic 30. Only then does the processor begin to complete the milli-instructions. The processor then continues decoding, executing and completing the milli-instructions.

Eventually, the detection logic 26 recognizes a millicode END (MEND) milli-instruction. When the detection logic 26 detects a MEND milli-instruction, it causes the processor to cease fetching milli-instructions. Further, when MEND is detected, the detection logic puts the decoder in macro-mode and causes the processor to begin fetching macro-instructions. Millicode explicitly updates all registers, so there is no transfer of register content when going from milli-mode operation to regular operation.

Completion of a MEND milli-instruction causes the processor completion logic to being completing macro-instructions.

The processor can also enter milli-mode in response to an interrupt. When the completion logic detects an interrupt, the interrupt priority logic 45 determines that an interrupt is to be serviced and it signals the instruction fetch unit, causing the decoder to initiate milli-mode. The recognition of an interruption condition causes the processor to halt macro-mode execution at the next interruptible point. The interrupt priority logic 45 also generates control inputs which are used by the milli-mode detection logic to generate an entry point address with which to address the cache. These milli-instructions are sent to the instruction registers where the decoder decodes them and schedules them for execution at the appropriate hardware execution elements.

The processor proceeds to decode, execute and complete the milli-instruction in the milli-routine for interrupts. Eventually, the decoder recognizes a MEND milli-instruction. This causes the decoder to stop decoding in milli-mode. Depending on whether or not there are additional interrupts that require servicing, the decoder hardware will either redo the interrupt process or return to decoding macro-instructions from the cache.

As described above, one of the operations frequently performed by a millicode routine is branching. Upon encountering a branch the instruction unit subsystem 16 of the processor sometimes fetches and decodes instructions on the incorrect path of the branch. The Test Millicode Branch Points (TMBP) instruction of the present invention significantly reduces the number of incorrect "fetches" as described further herein. In addition, due to limitations in the design of a pipeline processor, there is a limit to the number of outstanding branches that can be decided, but not yet executed, before the pipeline stalls and no more instructions are able to be decoded. This invention now allows multiple branch points to be tested via the TMBP instruction (that is, not via multiple branch instructions), and then only one branch instruction is executed after all of the branch points have been interrogated, thus avoiding stalls in the pipeline.

Figure 2:
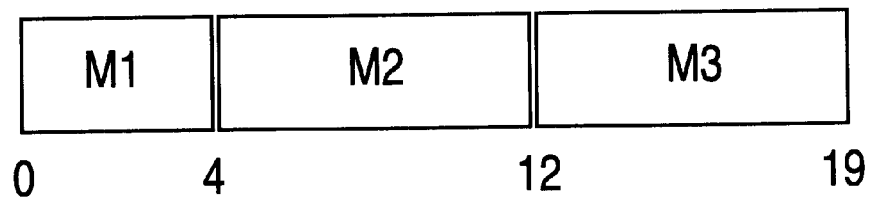
FIG. 2 is a pictorial representation of the millicode instruction "TMBP".

FIG. 2 illustrates a preferred embodiment of a TMBP instruction. The TMBP instruction comprises three mask fields. The first mask field (MI) is a 4-bit field which controls how the millicode condition code is modified by the TMBP instruction. The millicode condition code (not shown), which is provided by the hardware during the execution of a millicode routine, indicates the results of an operation or comparison and is represented by two bits, which can each be a '0' or a '1' bit. The second and third mask fields (M2, M3 respectively) each specify a millicode branch point to be tested.

When the TMBP instruction is executed, the M1, M2, and M3 fields of the instruction are interrogated by the hardware. Bits 0–1 of the M1 field control what logical function is to be performed on bit '0' of the condition code, and bits 2–3 of the M1 field control what logical function is performed on bit '1' of the condition code.

For purposes of illustration, the logical value of the hardware branch point M2 is defined as Q0. That is, Q0 would be a '1'b if the branch point specified by M2 were true, and would be a '0'b if the branch point were false. Assume also for purposes of illustration, that the logical value of the hardware branch point M3 is defined as Q1.

Accordingly, Q1 would be a '1'b if the branch point specified by M3 were true, and a '0'b if the branch point were false.

The two bits of the Millicode condition code are specified as CC.0 and CC.1, and in the current implementation are controlled by the M1 bits as follows:

M1.0–1 New CC.0
'00'b Q0
'01'b CC.0 'AND'Q0 'AND'Q1
'10'b CC.0 'AND'Q0
'11'b CC.0 'XOR'Q0
M1.2–3 New CC.1
'00'b Q1
'01'b CC.1 'OR'Q0 'OR'Q1
'10'b CC.1 'AND'Q1
'11'b CC.1 (unchanged)

Thus, it can be realized that either the current values of the M2 and M3 branch points can be placed directly into the condition code, or that logical functions can be performed on the M2 and M3 branch points in conjunction with the existing condition codes, with different functions being performed on the two different bits of the condition code. Then, with multiple executions of the TMBP instruction, many different branch points can be tested, without executing any actual branch instruction. After all of the branch points have been tested via the TMBP instruction, any conditional branch instruction can be executed to branch on the new condition code.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for testing branch points encountered during execution of a millicode routine for use in reducing the number of branch instructions required to test combinations of millicode branch points, wherein said testing includes a TMBP instruction, comprising:
   interrogating a millicode condition code;
   interrogating a first field of said TMBP instruction, wherein results of said interrogating determine a logical function to be performed on said millicode condition code, and wherein further said first field comprises four bits;
   interrogating a second field of said TMBP instruction, said second field specifying a first millicode branch point;
   interrogating a third field of said TMBP instruction, said third field specifying a second millicode branch point; and
   setting said millicode condition code by system hardware based upon results of said interrogating, wherein said setting said millicode condition code determines how said millicode routine executes subsequent TMBP instructions and conditional branch instructions.

2. The method of claim 1, wherein a first bit and a second bit of said first field determine a logical function to be performed on a first bit of said millicode condition code.

3. The method of claim 1, wherein a third bit and a fourth bit of said first field determine a logical function to be performed on a second bit of said millicode condition code.

4. The method of claim 2, wherein said logical function is an operation for causing a logical value specified in said second field of said TMBP instruction to be placed into said first bit of said millicode condition code.

5. The method of claim 2, wherein said logical function is a boolean operation comprising:
   a logical value of said first bit of said millicode condition code before execution of said TMBP instruction ANDed with a logical value of said second field of said TMBP instruction ANDed with a logical value of said third field of said TMBP instruction.

6. The method of claim 2, wherein said logical function is a boolean operation comprising:
   a logical value of said first bit of said millicode condition code before execution of said TMBP instruction ANDed with a logical value of said second field of said TMBP instruction.

7. The method of claim 2, wherein said logical function is a boolean operation comprising:
   a logical value of said first bit of said millicode condition code before execution of said TMBP instruction EXCLUSIVE ORed with a logical value of said second field of said TMBP instruction.

8. The method of claim 3, wherein said logical function is an operation for causing a logical value specified in said third field of said TMBP instruction to be placed into said second bit of said millicode condition code.

9. The method of claim 3, wherein said logical function is a boolean operation comprising:
   a logical value of said second bit of said millicode condition code before execution of said TMBP instruction ORed with a logical value of said second field of said TMBP instruction ORed with a logical value of said third field of said TMBP instruction.

10. The method of claim 3, wherein said logical function is a boolean operation comprising:
    a logical value of said second bit of said millicode condition code before execution of said TMBP instruction ANDed with a logical value of said third field of said TMBP instruction.

11. The method of claim 3, wherein said logical function is an operation for causing said logical value of said second bit of said millicode condition code before execution of said TMBP instruction to remain unchanged after said execution of said TMBP instruction.

12. A pipelined computer processing system for testing branch points encountered during execution of a millicode routine for use in reducing the number of branch instructions required to test combinations of millicode branch points, wherein said testing includes a TMBP instruction, comprising a pipelined computer processor for:
    interrogating a millicode condition code;
    interrogating a first field of said TMBP instruction, wherein results of said interrogating determine a logical function to be performed on said millicode condition code, and wherein further said first field comprises four bits;
    interrogating a second field of said TMBP instruction, said second field specifying a first millicode branch point;
    interrogating a third field of said TMBP instruction, said third field specifying a second millicode branch point; and
    setting said millicode condition code by system hardware based upon results of said interrogating, wherein said setting said milli-code condition code determines how said millicode routine executes subsequent TMBP instructions and conditional branch instructions.

13. The system of claim 12 wherein a first bit and a second bit of said first field determine a logical function to be performed on a first bit of said millicode condition code.

14. The system of claim 12 wherein a third bit and a fourth bit of said first field determine a logical function to be performed on a second bit of said millicode condition code.

15. The system of claim 13, wherein said logical function is an operation for causing a logical value specified in said second field of said TMBP instruction to be placed into said first bit of said millicode condition code.

16. The system of claim 13, wherein said logical function is a boolean operation comprising:

a logical value of said first bit of said millicode condition code before execution of said TMBP instruction ANDed with a logical value of said second field of said TMBP instruction ANDed with a logical value of said third field of said TMBP instruction.

17. The system of claim 13, wherein said logical function is a boolean operation comprising:

A logical value of said first bit of said millicode condition code before execution of said TMBP instruction ANDed with a logical value of said second field of said TMBP instruction.

18. The system of claim 13, wherein said logical function is a boolean operation comprising:

a logical value of said first bit of said millicode condition code before execution of said TMBP instruction EXCLUSIVE ORed with a logical value of said second field of said TMBP instruction.

19. The system of claim 14, wherein said logical function is an operation for causing a logical value specified in said third field of said TMBP instruction to be placed into said second bit of said millicode condition code.

20. The system of claim 14, wherein said logical function is a boolean operation comprising:

a logical value of said second bit of said millicode condition code before execution of said TMBP instruction ORed with a logical value of said second field of said TMBP instruction ORed with a logical value of said third field of said TMBP instruction.

21. The system of claim 14, wherein said logical function is a boolean operation comprising:

a logical value of said second bit of said millicode condition code before execution of said TMBP instruction ANDed with a logical value of said third field of said TMBP instruction.

22. The system of claim 14, wherein said logical function is an operation causing said logical value of said second bit of said millicode condition code before execution of said TMBP instruction to remain unchanged after said execution of said TMBP instruction.

23. A storage medium encoded with machine-readable computer program code for testing branch points encountered during execution of a millicode routine for use in reducing the number of branch instructions required to test combinations of millicode branch points, wherein said testing includes a TMBP instruction, the storage medium including instructions for causing a computer to implement a method comprising:

interrogating a millicode condition code;

interrogating a first field of said TMBP instruction, wherein results of said interrogating determine a logical function to be performed on said millicode condition code, and wherein further said first field comprises four bits;

interrogating a second field of said TMBP instruction, said second field specifying a first millicode branch point;

interrogating a third field of said TMBP instruction, said third field specifying a second millicode branch point; and setting said millicode condition code by system hardware based upon results of said interrogating, wherein said setting said millicode condition code determines how said millicode routine executes subsequent TMBP instructions and conditional branch instructions.

24. The storage medium of claim 23, wherein a first bit and a second bit of said first field determine a logical function to be performed on a first bit of said millicode condition code.

25. The storage medium of claim 23, wherein a third bit and a fourth bit of said first field determine a logical function to be performed on a second bit of said millicode condition code.

26. The storage medium of claim 24, wherein said logical function is an operation for causing a logical value specified in said second field of said TMBP instruction to be placed into said first bit of said millicode condition code.

27. The storage medium of claim 24, wherein said logical function is a boolean operation comprising:

a logical value of said first bit of said millicode condition code before execution of said TMBP instruction ANDed with a logical value of said second field of said TMBP instruction ANDed with a logical value of said third field of said TMBP instruction.

28. The storage medium of claim 24, wherein said logical function is a boolean operation comprising:

a logical value of said first bit of said millicode condition code before execution of said TMBP instruction ANDed with a logical value of said second field of said TMBP instruction.

29. The storage medium of claim 24, wherein said logical function is a boolean operation comprising:

a logical value of said first bit of said millicode condition code before execution of said TMBP instruction EXCLUSIVE ORed with a logical value of said second field of said TMBP instruction.

30. The storage medium of claim 25, wherein said logical function is an operation for causing logical value specified in said third field of said TMBP instruction to be placed into said second bit of said millicode condition code.

31. The storage medium of claim 25, wherein said logical function is a boolean operation comprising:

a logical value of said second bit of said millicode condition code before execution of said TMBP instruction ORed with a logical value of said second field of said TMBP instruction ORed with a logical value of said third field of said TMBP instruction.

32. The storage medium of claim 25, wherein said logical function is a boolean operation comprising:

a logical value of said second bit of said millicode condition code before execution of said TMBP instruction ANDed with a logical value of said third field of said TMBP instruction.

33. The storage medium of claim 25, wherein said logical function is an operation for causing said logical value of said second bit of said millicode condition code before execution of said TMBP instruction to remain unchanged after said execution of said TMBP instruction.

* * * * *